C. CUSTER.
Grinding-Mill.

No. 211,383. Patented Jan. 14, 1879.

Witnesses.
Henry Howson Jr.
Harry A. Crawford.

Inventor,
Christian Custer
by his Attorneys
Howson and Son

UNITED STATES PATENT OFFICE.

CHRISTIAN CUSTER, OF PHILADELPHIA, PENNSYLVANIA, ASSIGNOR TO CHARLES K. BULLOCK, OF SAME PLACE.

IMPROVEMENT IN GRINDING-MILLS.

Specification forming part of Letters Patent No. 211,383, dated January 14, 1879; application filed August 19, 1878.

*To all whom it may concern:*

Be it known that I, CHRISTIAN CUSTER, of Philadelphia, Pennsylvania, have invented a new and useful Improvement in Portable Grinding-Mills, of which the following is a specification:

My invention relates to certain improvements in that class of portable grinding-mills in which a horizontal mill-spindle and vertical millstones are combined with an outer casing, my improvements being too fully explained hereinafter to need preliminary description.

Figure 1:
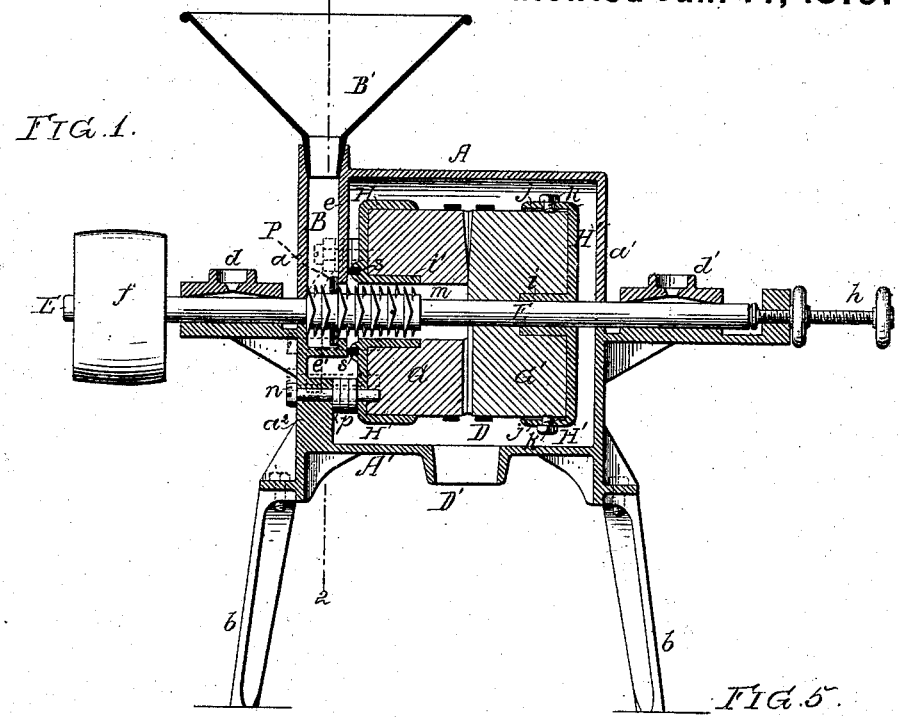
Figure 2:
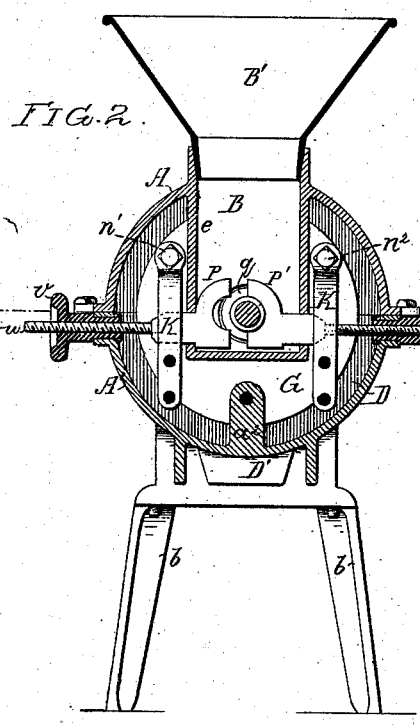
Figure 3:
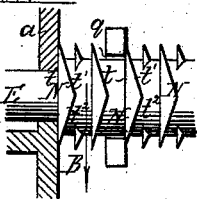
Figure 4:
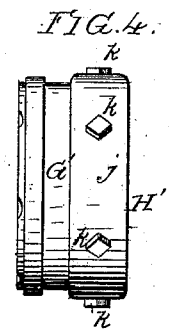

In the accompanying drawing, Figure 1 is a vertical section of my improved portable grinding-mill; Fig. 2, a transverse vertical section on the line 1 2; Fig. 3, a face view of one of the millstones; Fig. 4, an exterior side view of one of the stones; and Fig. 5, an enlarged view of part of the mill-spindle.

The cylindrical casing A of the mill is made in two parts, the junction of which is on the line 3 3, Fig. 2, and is supported on suitable legs $b$, the interior of this casing being separated by a partition, $e\ e'$, into the feed-compartment B, communicating with the hopper B', and the grinding-compartment D, devoted to the millstones and having an outlet D'.

Through the center of the casing and through the partition $e$ passes the horizontal mill-spindle E, having suitable bearings $d\ d'$ on one end, $a$, and the other on the opposite end, $a^1$, of the said casing, one end of the spindle being furnished with a pulley, $f$, and a tail-screw, $h$, bearing against the opposite end, the said screw passing through a portion of the bracket on which is the bearing $d'$, and being provided with a suitable jam-nut. G and G' are the two millstones, the latter being securely fitted to a flanged disk, H', the central hub, $i$, of which is secured to the mill-spindle E.

It may be remarked here that, as this millstone is vertical and revolves at a high rate of speed, it is advisable that it should be properly balanced, in order to prevent the violent shaking of the entire structure. For this purpose I make in the flange $j$ of the disk H' a number of holes, preferably at equal distances apart throughout its circumference, each hole being threaded for the reception of the stem of a set-screw, $k$. Should the stone be out of balance in the first instance, one or more of these set-screws may be entirely removed at the proper points in the circumference of the disk; or lighter or heavier set-screws may be attached to the flange, as the desired proper balancing of the stone may suggest.

The fixed millstone G is securely fitted to the flanged disk H, the interior of the central hub, $i'$, of which is a continuation of the eye $m$ of the stone. The disk H is secured to the end $a$ of the casing at three points—at one point to the enlarged portion $a^2$ of the casing by a bolt, $n$, and at the remaining points, by similar bolts $n^1$ and $n^2$, Fig. 2, to the upper ends of bars K K, which are bolted at their lower ends to the inner face of the said end $a$ of the casing. The disk, however, does not bear rigidly against the bars and casing, but against cushions $p$, of rubber or other equivalent yielding material, so that the stone G can be readily so adjusted that its grinding-face shall coincide with that of the stone G'.

Between the flanged disk H and the partition $e$ intervenes a ring, $s$, of rubber or other equivalent yielding material, adapted to a recess in the outer face of the said disk, this ring preventing the grain from passing into the compartment D.

The only communication between the feeding-compartment B and grinding-compartment D of the mill is through a circular opening, $q$, Fig. 2, in the partition $e$ between the two compartments, this opening being concentric with the mill-spindle.

A portion of the spindle (shown on an enlarged scale in Fig. 5) has a number of projections, N N, of triangular form, one edge, $t$, of each projection being in a plane at right angles to the shaft, and the other two edges, $t^1$ and $t^2$, being inclined in direction the reverse of each other. This portion of the shaft with triangular projections is contained partly within the feed-compartment B, partly within the opening $q$ in the partition $e$, and partly in the interior of the central hub of the disk H, which, as before remarked, is a continuation of the eye of the stone.

Whichever direction the mill-spindle may be turned in, the feeding effect of the triangular projections will be the same. If the spindle be turned in the direction of the arrow, Fig. 5, for instance, the inclined sides $t^2$ of the projections will propel the grain from the feeding-compartment through the eye of the stone; and if the spindle be turned in the opposite direction, the inclined sides $t^1$ will be the means of moving the grain in the same direction. This is an important feature of my invention, as it enables the purchaser of the mill to drive the same in the direction which the nature of his driving appliances may suggest as the most convenient and inexpensive.

Figure 5:
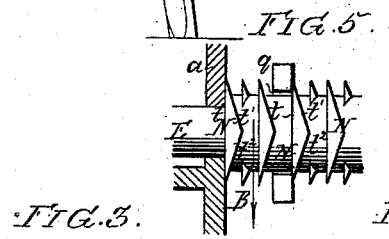

The amount of grain fed to the eye of the stone will depend upon the position of the two adjustable gates P P', contained within the feed-chamber B adjacent to the partition $e$, both gates being made to fit to the spindle between the triangular projections on the same, as shown in Fig. 5. When closed, these gates will entirely cover the opening $q$ in the partition $e$, in which case no grain can pass to the eye of the stone; or one or both gates can be partially or wholly opened, as the required supply of grain to the stones may demand.

In the present instance the gates are arranged to slide in the sides of the feed-chamber, and a screw-stem, $u$, is adapted to an internally-threaded nut, $v$, which is arranged to turn in the casing A of the mill, but is otherwise confined to the same.

In mills having stones the grinding-faces of which are vertical, the flour is apt to pass from the stones having the ordinary dress in an unfinished condition; hence I have adopted the dress shown in Fig. 3, the depressed portions of the face of the stone being shaded and the land portion unshaded.

The radial depressions $w$ concentrate at the center of the stone, and do not extend out through the edge of the same; hence they form pockets, from which the partially-ground grain cannot escape without crossing the land before reaching the triangular depressions $x$. By this arrangement, also, I insure a proper draft of the material which is being ground, whether the stones are run in one direction or the other.

I claim as my invention—

1. The combination of the partition $e$, of the casing, the millstone G, the elastic support for the latter, and the yielding ring $s$, which surrounds the feed-opening, as set forth.

2. The combination of the partition $e$, between the compartments of the casing and the opening $q$ in the said partition, with the mill-spindle, having triangular projections N, as and for the purpose set forth.

3. The combination of the partition $e$, having an opening, $q$, and the mill-spindle with adjustable gates P P', adapted to the said opening and spindle, substantially as set forth.

4. The stones G G', having radial depressions $w$, which extend outward from the eye part way to the periphery, and triangular depressions $x$, which extend inward from the periphery part way to the eye, as set forth.

In testimony whereof I have signed my name to this specification in the presence of two subscribing witnesses.

CHRISTIAN CUSTER.

Witnesses:
 HARRY A. CRAWFORD,
 HUBERT HOWSON.